US006363373B1

(12) United States Patent
Steinkraus

(10) Patent No.: US 6,363,373 B1
(45) Date of Patent: Mar. 26, 2002

(54) METHOD AND APPARATUS FOR CONCEPT SEARCHING USING A BOOLEAN OR KEYWORD SEARCH ENGINE

(75) Inventor: David W. Steinkraus, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/164,284

(22) Filed: Oct. 1, 1998

(51) Int. Cl.[7] .............................. G06F 17/30; G06F 7/00
(52) U.S. Cl. ..................................... 707/3; 707/4; 707/5
(58) Field of Search ............................ 707/3, 4–7, 500, 707/526, 530; 704/4, 9, 8

(56) References Cited

U.S. PATENT DOCUMENTS

| | | | | |
|---|---|---|---|---|
| 5,675,819 A | * | 10/1997 | Schuetze | 704/10 |
| 5,724,571 A | * | 3/1998 | Woods | 707/5 |
| 6,006,221 A | * | 12/1999 | Liddy et al. | 707/5 |
| 6,026,388 A | * | 2/2000 | Liddy et al. | 707/1 |
| 6,038,560 A | * | 3/2000 | Wical | 707/5 |
| 6,076,088 A | * | 6/2000 | Paik et al. | 707/3 |
| 6,094,652 A | * | 7/2000 | Faisal | 707/5 |
| 6,094,657 A | * | 7/2000 | Hailpern et al. | 707/103 |

OTHER PUBLICATIONS

Salton, Gerard. *Automatic Text Processing.* Addison–Wesley Publishing Company, MA. Pp. 313–319. 1989.

* cited by examiner

Primary Examiner—Hosain T. Alam
Assistant Examiner—Alford W. Kindred
(74) Attorney, Agent, or Firm—Merchant & Gould

(57) ABSTRACT

Concept searching using a Boolean or keyword search engine. Documents are preprocessed before being passed to a search engine by identifying, on a word-by-word basis, the "word tokens" contained in the document. Once the word tokens have been extracted, each word token is referenced in a concept database that maps word tokens to concept identifiers. The concept identifiers associated with the word tokens are converted into unique non-word concept tokens and arranged into a list. The list is then inserted into the document as invisible but searchable text. The document is then transferred to the server monitored by the search engine. Search queries are preprocessed before being passed to the search engine in the same manner. The query is first broken into word tokens and the word tokens are then referenced in the concept database. All associated concept identifiers are retrieved and converted to unique concept tokens. The concept tokens are then combined into a string and sent to the search engine as an ordinary query.

16 Claims, 5 Drawing Sheets

METHOD AND APPARATUS FOR CONCEPT SEARCHING USING A BOOLEAN OR KEYWORD SEARCH ENGINE

TECHNICAL FIELD

This invention generally relates to database search engines for computer systems. More particularly, this invention relates to concept searching using a Boolean or keyword search engine.

BACKGROUND OF THE INVENTION

Database search engines permit users to perform queries on a set of documents by submitting search terms. Users must typically submit one or more search terms to the search engine in a format specified by the search engine. Most search engines specify that search terms should be submitted as a Boolean or keyword search query (i.e. "red OR green" or "blue AND black"). Boolean or keyword search queries can become extremely complex as the user adds more search terms and Boolean operators. Moreover, most search engines have complex syntax rules regarding how a Boolean or keyword search query must be constructed. For users to get accurate search results, therefore, they must remember the appropriate syntax rules and apply them in an effective manner. This process can be difficult for many users and, unless mastered, may result in searches which return irrelevant documents.

"Natural language" search engines have been developed which permit users to submit a natural language query to the search engine rather than just keywords. For instance, a user may input the simple natural language sentence "How do I fix my car?" instead of the more complex Boolean search query "how AND to AND fix AND car?" Instead of searching for just the keywords contained in the search query, a typical natural language search engine will extract the concepts implied by the query and search the database for documents referencing the concepts. A natural language search engine will therefore return documents from its database which contain the concepts contained in the search query even if the documents do not contain the exact words in the search query. A natural language search query may be submitted to a Boolean or keyword search engine. However, these types of search engines will only return documents containing the exact words in the search query.

Although natural language search engines provide the benefits of easy to understand natural language search queries and concept searching, natural language search engines are not without their drawbacks. For example, natural language search engines are considerably more expensive to develop than a Boolean or keyword search engine. Moreover, natural language search engines can be difficult and expensive to implement, especially where they are used to replace existing Boolean or keyword search engines.

Therefore, there is a need for a method and apparatus for database searching which (1) permits effective searching using a Boolean or keyword search engine with natural language search queries, (2) which permits concept searching using a Boolean or keyword search engine, and (3) which may be implemented without any modification to the Boolean or keyword search engine.

SUMMARY OF THE PRESENT INVENTION

The present invention satisfies the above-described needs by providing a method and apparatus for concept searching using a Boolean or keyword search engine. Using the method and apparatus of the exemplary embodiment, documents are preprocessed before being passed to the search engine for inclusion in the search engine's database. Search queries are also preprocessed before being passed to the search engine.

With regard to the preprocessing of documents, each document is scanned on a word-by-word basis to identify the "word tokens" contained in the document. Word tokens are actual words or word-like strings such as dates, numbers, etc. Once the word tokens in a document have been extracted, each word token is located in a "concept database" that maps word tokens to concept identifiers. Each word token may map to zero or more concept identifiers.

Once the concept identifiers associated with each word token have been extracted from the concept database, a consolidated list of concept identifiers is created. Each of the concept identifiers in the list is then converted into a unique non-word concept token which identifies the concept. A concept token is a non-word character string which identifies and is mapped to a concept. For instance, the concept token "Q1A5" may map to the concept of "color." These concept tokens are then arranged into a list.

Once the list of concept tokens has been created, the tokens are inserted into the document. In an exemplary embodiment, a hypertext markup language ("HTML") META tag is used to insert the concept tokens into the document. Using the HTML META tag, the concept tokens are treated as ordinary text by the search engine and therefore may be searched, but are invisible to the user. The document is then transferred to the server monitored by the search engine. All documents indexed by the search engine are preprocessed in this manner.

With regard to the preprocessing of search queries, an additional component is interposed between the query submitted by the user and the search engine. This component preprocesses the query in much the same way as document preprocessing described above, and then sends a modified query to the search engine.

Queries are preprocessed by first breaking the search terms into word tokens. The word tokens are then referenced in the concept database (the same database used for document preprocessing) and any associated concept identifiers are retrieved. The concept identifiers are then converted to unique concept tokens as described above and are combined into a string with separating spaces. Text is prepended to the string to instruct the search engine to search the contents of all documents' META tags for the tokens. This string constitutes the preprocessed query which is then sent to the search engine.

The unmodified Boolean or keyword search engine then finds all of the documents whose concept tokens most closely match the concept tokens in the modified query. The preprocessing of both documents and queries is transparent to the search engine. However, the exemplary embodiment of the present invention described herein solves all of the above-described problems by modifying the built-in functionality of the Boolean or keyword search engine to search for concepts rather than keywords.

Therefore, it is an object of the present invention to provide a method and apparatus for database searching which permits effective searching using a Boolean or keyword search engine with natural language search queries.

It is also an object of the present invention to provide a method and apparatus for database searching which permits concept searching using a Boolean or keyword search engine.

It is a further object of the present invention to provide a method and apparatus for natural language and concept searching using a Boolean or keyword search engine which may be implemented without any modification to the Boolean or keyword search engine.

That the present invention and the exemplary embodiments thereof overcome the problems and drawbacks set forth above and accomplish the objects of the invention set forth herein will become apparent from the detailed description of exemplary embodiments which follows.

DETAILED DESCRIPTION OF AN EXEMPLARY EMBODIMENT

In an exemplary embodiment of the present invention, an application program is interposed between a user and a Boolean or keyword search engine which preprocesses documents prior to submission to the search engine's database and also preprocesses search queries prior to submission to the search engine. In this manner, a Boolean or keyword search engine may be searched for concepts.

Exemplary Operating Environment

Figure 1:
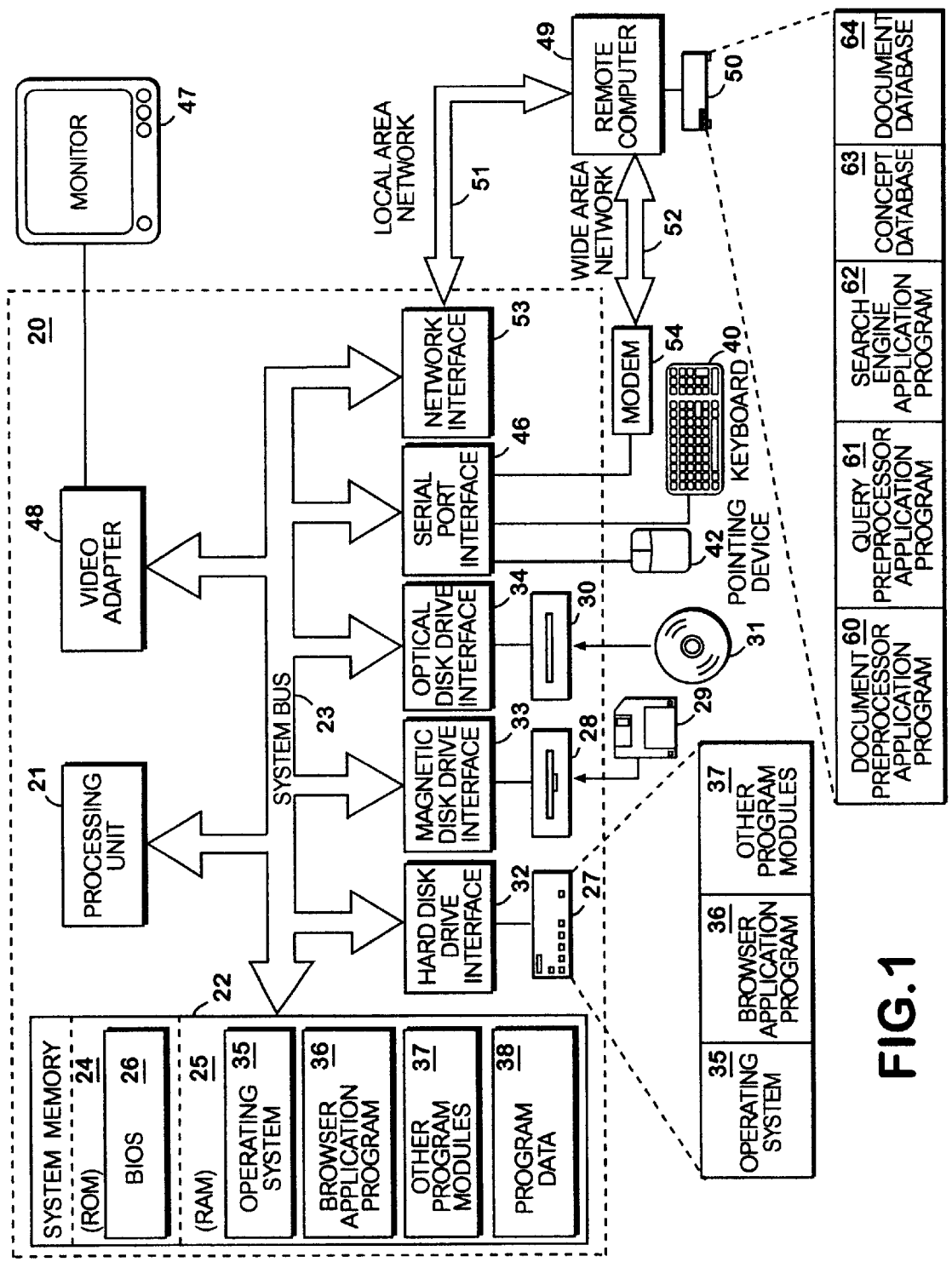
FIG. 1 is a block diagram of a networked personal computer that provides the operating environment for an embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

As discussed earlier, the exemplary embodiments of the present invention are embodied in application programs run by an operating system 35. The operating system 35 generally controls the operation of the previously discussed personal computer 20, including input/output operations. In the exemplary operating environment, the invention is used in conjunction with Microsoft Corporation's "WINDOWS NT" and "WINDOWS 95" operating systems. However, it should be understood that the invention can be implemented for use in other operating systems, such as Microsoft Corporation's "WINDOWS 3.1" and "WINDOWS 95" operating systems, IBM Corporation's "OS/2" and "AIX" operating systems, SunSoft's "SOLARIS" operating system used in workstations manufactured by Sun Microsystems, Hewlett-Packard's "HP-UX" and "RT-UX" operating systems, and the operating systems used in "MACINTOSH" computers manufactured by Apple Computer, Inc.

Figure 2:
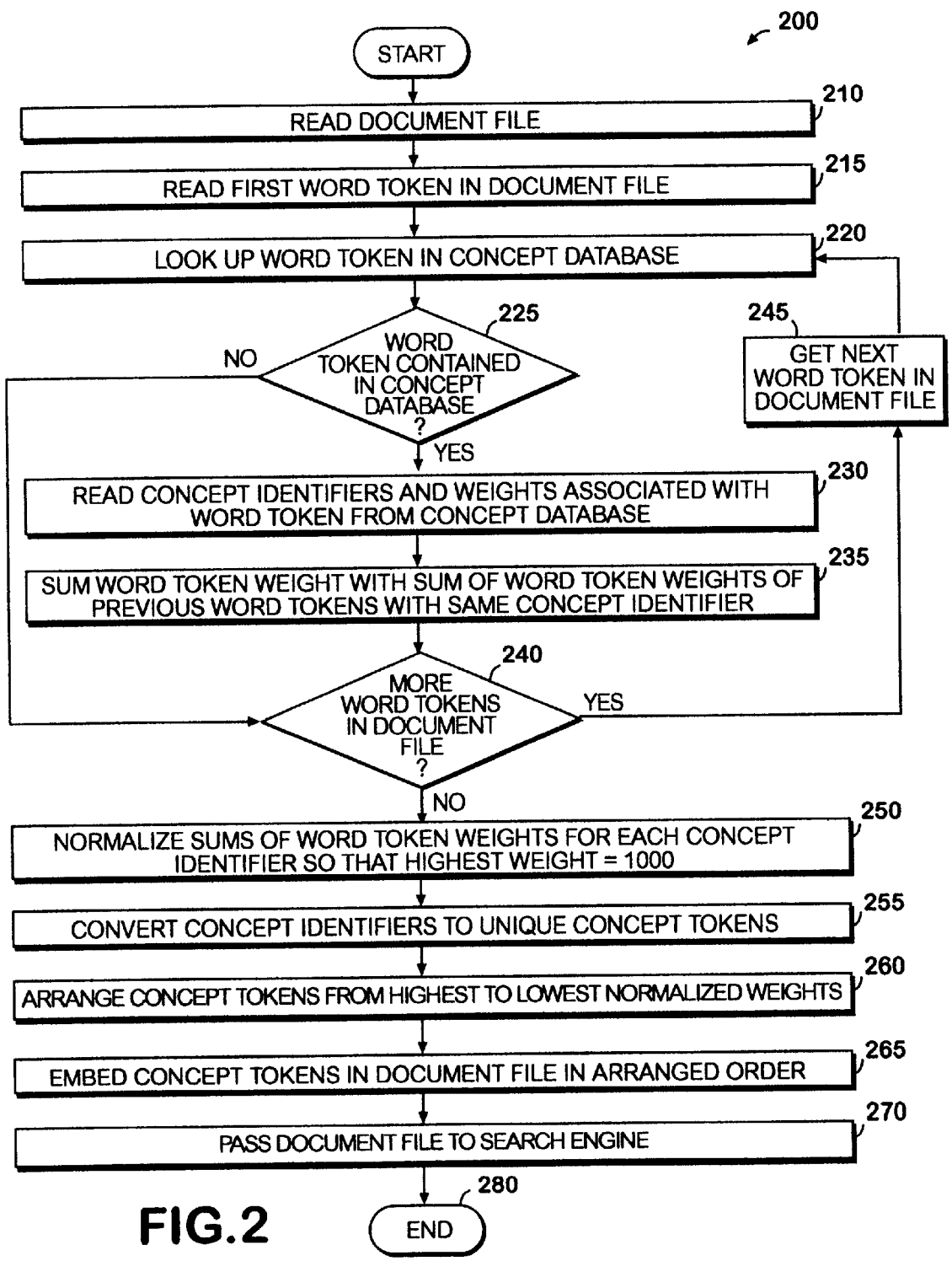
FIG. 2 is a flow diagram illustrating steps for the preprocessing of documents.
Figure 3:
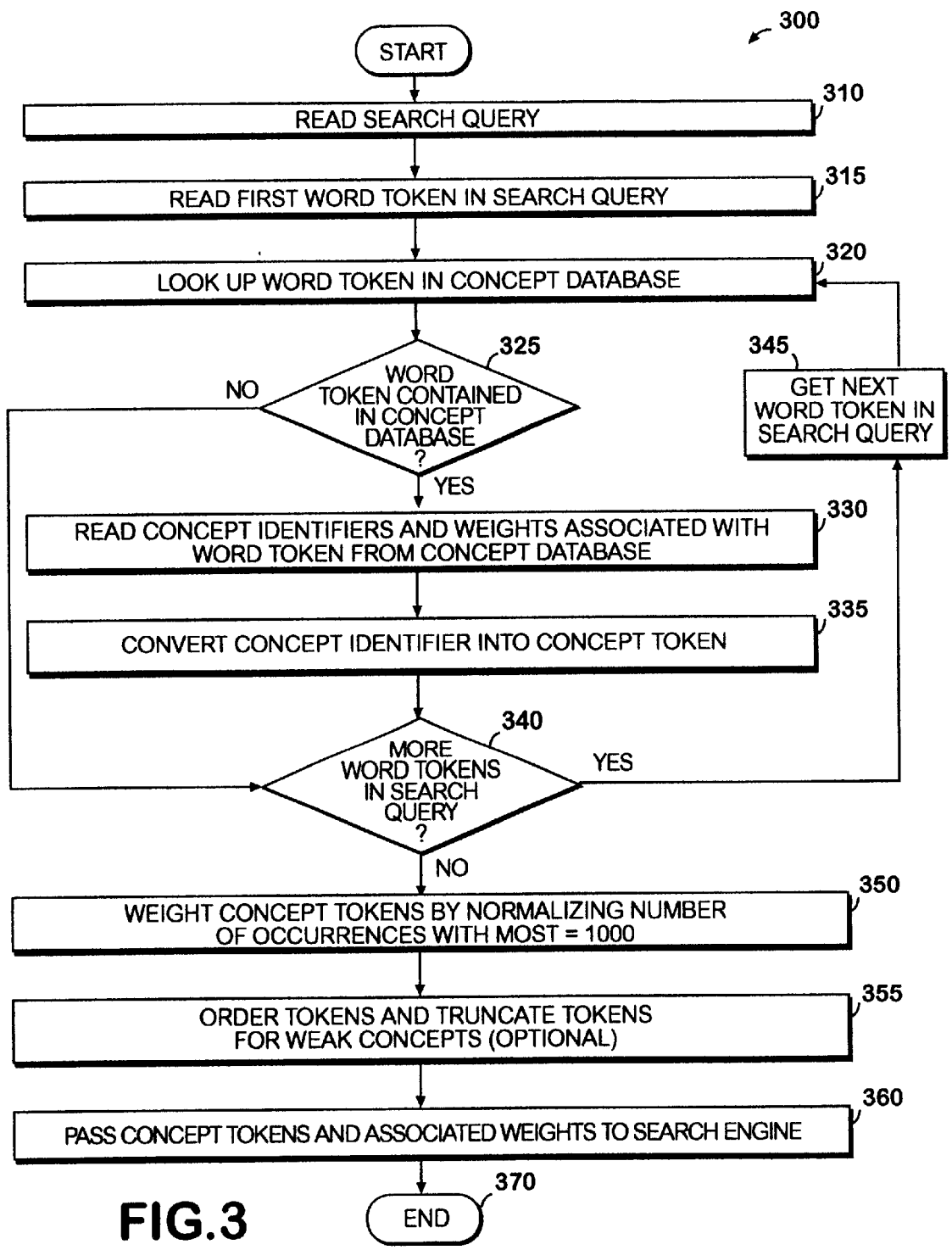
FIG. 3 is a flow diagram illustrating steps for the preprocessing of database queries.
Figure 4:
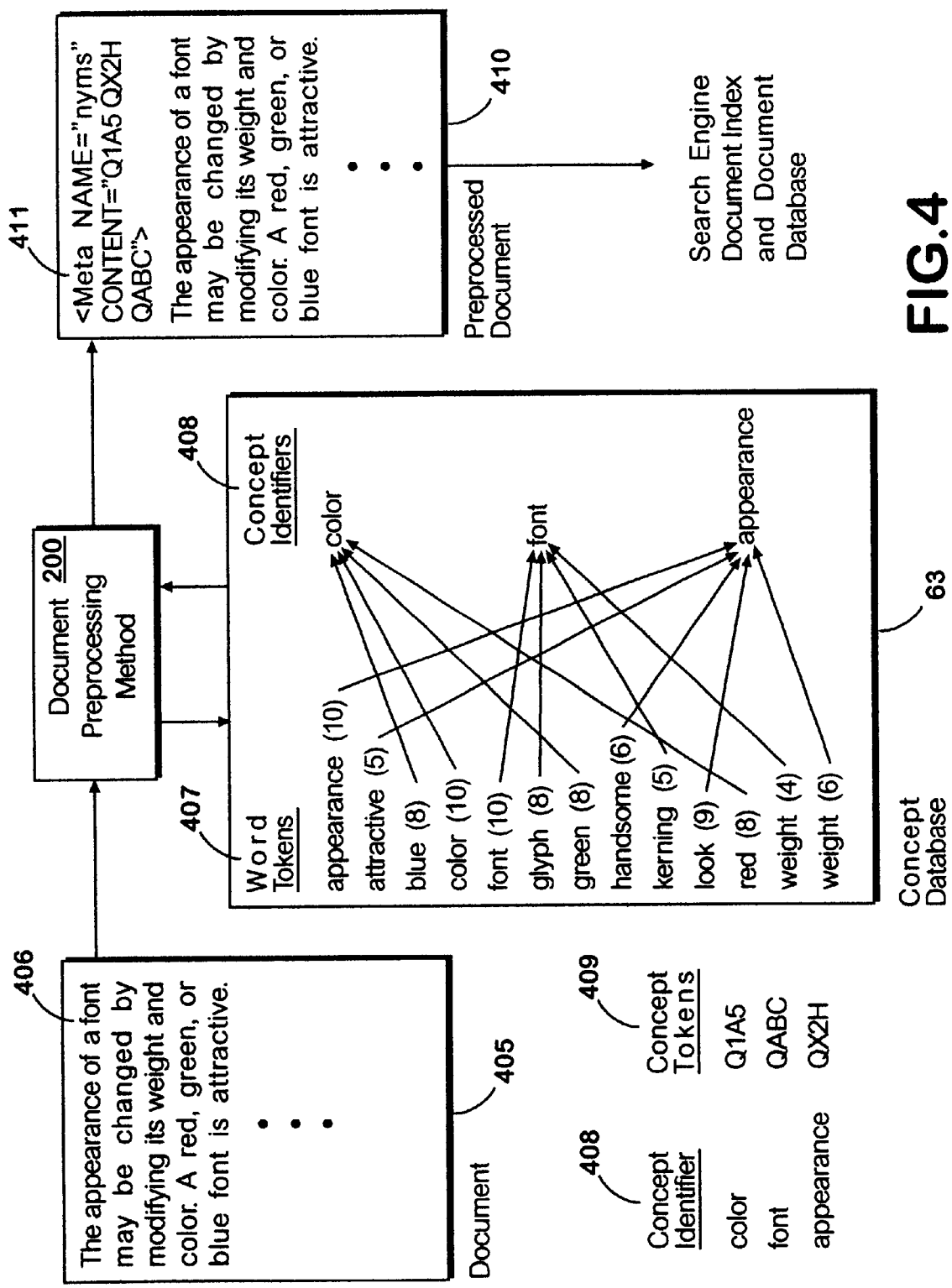
FIG. 4 is a diagram illustrating the preprocessing of an exemplary document.
Figure 5:
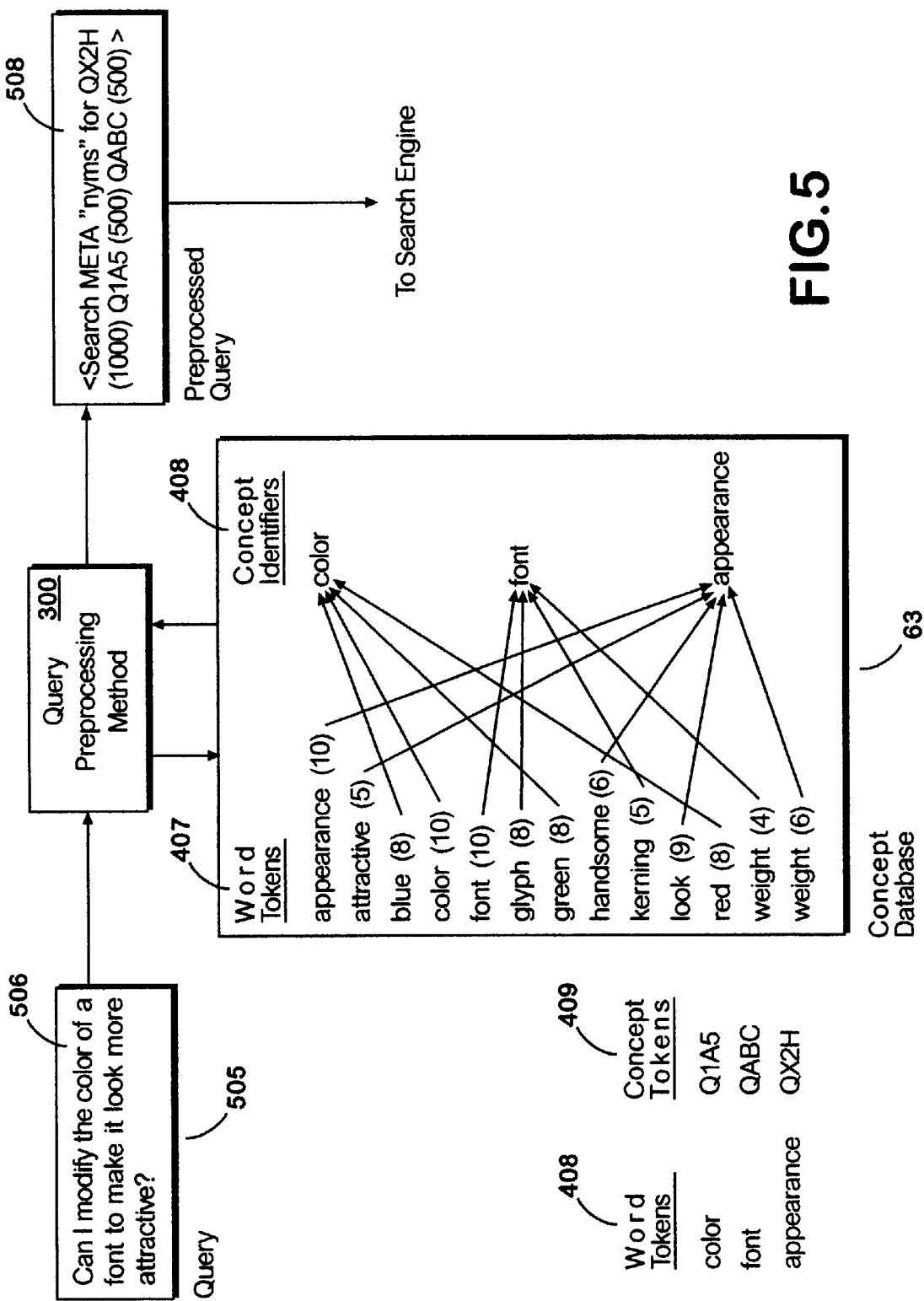
FIG. 5 is a diagram illustrating the preprocessing of an exemplary database query.

With the above preface on the exemplary operating environment for embodiments of the present invention, the remaining figures illustrate aspects of several embodiments of the present invention. In FIG. 2, a flow diagram is illustrated showing the steps for the preprocessing of documents. FIG. 3 is a flow diagram illustrating the steps for preprocessing database queries. In FIG. 4, the operation of the method and apparatus of an exemplary embodiment of the present invention are shown using an exemplary document. In FIG. 5 the operation of the method and apparatus of an embodiment of the present invention is illustrated using an exemplary database query.

Operation of a Typical Boolean or keyword Search Engine

The present invention modifies the built-in functionality of a typical Boolean or keyword search engine to permit searching for concepts. Therefore, in order to understand the operation of the present invention, it is helpful to understand the operation of a typical Boolean or keyword search engine.

Many Boolean or keyword search engines function by applying the following method to each searchable document. First, the document file is read, and the plain text is extracted. Any non-text information and special formatting codes are ignored. The plain text is then broken into strings delimited by spaces and punctuation characters, to produce a series of word tokens. Word tokens can be actual words, or word-like strings such as dates, numbers, etc. An "inverted index" is then built for the document file. For a given word token, this index can return the list of all searchable documents containing that word token.

When a search query is submitted to the search engine, a similar process extracts the word tokens from the search query. The inverted index is then searched to find documents which best match the query at a word token level. The closeness of match is most commonly based on whether the document satisfies a Boolean expression made up of the query terms, or on a weighted aggregate of the terms in both the query and the document such as the well-known "Vector Space Model" (see e.g. "Automatic Text Processing", G. Salton [Addison-Wesley, 1989], section 10.1.1). The present invention modifies the above-described functionality of a typical Boolean or keyword search engine to permit searching for concepts rather than mere word tokens.

The Methods and Apparatus of the Disclosed Embodiments

The disclosed embodiment for concept searching using a Boolean or keyword search engine comprises two separate methods. In an exemplary embodiment, these methods are embodied in application program software modules. The first of these two methods preprocesses documents prior to submission to the search engine for inclusion in the search engine's database. The second of these two methods preprocesses database queries prior to submission to the search engine. These methods are described in detail below.

Document Preprocessing

The first method of the disclosed embodiment preprocesses documents prior to submission to the search engine for inclusion in its database of searchable documents. Referring now to FIGS. 1 and 2, the method 200 for preprocessing documents begins at step 210 where a document file is read. At step 215, the first word token in the document file is read. As indicated above, word tokens may be actual words, word-like strings such as dates and numbers, or any other combination of characters.

From step 215, the method continues to step 220, where the word token is looked up in the concept database 63. The concept database 63 is a database which maps word tokens to concepts. In particular, each word token contained in the concept database 63 may map to zero or more concept identifiers. For instance, the word token "red" may map to the concepts "color," "hue," and "shade." In an embodiment, each word token may also have an associated numerical "weight" which describes how strongly the word token implies the concept represented by the associated concept identifier. The concept database 63 is created manually.

From step 220, the method continues to decision step 225, where a determination is made as to whether the word token is contained in the concept database 63. If the word token is not contained in the concept database 63, the "NO" branch is taken to step 240. If the word token is contained in the concept database 63, the "YES" branch is followed to step 230, where the concept identifiers associated with the word token, if any, are read from the concept database 63. Also read are the numerical weights, if any, associated with the word token.

From step 230, the method continues to step 235, where the word token weight is summed with the sum of the word token weights for any previous word tokens in the document file which had the same concept identifier. In this manner, the sum of all of the numerical weights for word tokens which have the same concept identifier is created. As discussed in more detail below, this number indicates how strongly a concept is described in a document file and is used to order word tokens according to "strength."

From step 230, the method continues to decision step 240, where a determination is made as to whether there are more word tokens in the document file. If there are more word tokens contained in the document file, the "YES" branch is taken to step 245, where the next word token in the document file is read. If there are no more word tokens contained in the document file, the "NO" branch is taken to step 250, where the sums of the word tokens weights for all concept identifiers are normalized so that the concept identifier with the highest weight equals 1000. For instance, if three concept identifiers have sums of word token weights of 135, 256, and 350, after normalization, their normalized weights would be 386, 731, and 1000, respectively.

From step 250, the method continues to step 255, where the concept identifiers are assigned to concept "tokens." Concept tokens are non-word strings of characters which uniquely identify the concepts. In an embodiment, each concept token is a string of characters consisting of an uppercase 'Q' followed by three characters which are either the numerical digits (0–9) or upper-case letters (A–Z). Specifically, concept tokens are created in this manner by converting the concept identifiers to base 36 (26 letters of the alphabet plus 10 digits) and then mapping the base 36 digits (0–35) to the characters A–Z. 0–9. An uppercase 'Q' is then prepended to the string. In this manner, each concept identifier is assigned a unique non-word concept token such as 'QABC,' 'Q1A5,' or 'QX2H.' Other methods for creating unique concept tokens will be appreciated by those skilled in the art, the only requirement being that the search engine must recognize such tokens as individual words and include them in the inverted index.

From step 255, the method continues to step 260, where the concept tokens are arranged in order of their associated normalized weights. From step 260, the method continues to step 265, where the concept tokens are embedding into the document file in their arranged order. In an exemplary embodiment, a hypertext markup language ("HTML") META tag is inserted into the document to embed the concept tokens. Using an HTML META tag, the concept tokens are treated as ordinary text by the search engine and may be searched, but are not displayed and are therefore invisible to the user. Specifically, the NAME portion of the HTML META tag is the arbitrary string "nyms" and the CONTENT portion is a space-separated list of concept tokens that encodes the concepts found in the document. The arbitrary string "nyms" will later be used to instruct the search engine to search the CONTENT portion of the META tag for concept tokens. This is described below. An example of a typical META tag containing concept tokens is:

<META NAME="nyms" CONTENT="QABC Q1A5 QX2H">

Other means for storing invisible text in a document file will be appreciated by those skilled in the art.

From step 265, the method continues to step 270, where the document file with encoded concept tokens is passed to the search engine for normal indexing and inclusion in the search engine's database. The method 200 ends at step 280.

Query Preprocessing

Once all documents have been preprocessed as described above in connection with the method 200, the method 300 for preprocessing search queries may begin. As discussed above, the method 300 for preprocessing queries is embodied in an application program software module interposed between the user and the search engine. The operation of this software module is transparent to the user.

Referring now to FIGS. 1 and 3, the method 300 begins at step 310 where the search query input by the user is read. At step 315, the first word token contained in the search query is read. As described above, word tokens may be words, word-like strings, numbers, etc. At step 320, the word token is looked up in the concept database 63. The same concept database 63 described above for the preprocessing of documents is also used for the preprocessing of search queries.

From step 320, the method continues to decision step 325, where a determination is made as to whether the word token is contained in the concept database 63. If the word token is not contained in the concept database 63, the "NO" branch is taken to step 340. If the word token is contained in the concept database 63, the "YES" branch is followed to step 330, where the concept identifiers, if any, associated with the word token are read from the concept database 63. From step 330, the method continues to step 335, where the concept identifiers are converted into unique non-word concept tokens. This process is the same as the process described above in connection with the preprocessing of documents.

From step 355, the method continues to decision step 340, where a determination is made as to whether there are more word tokens contained in the search query. If there are more word tokens contained in the search query, the "YES" branch is taken to step 345 where the next word token in the search query is read. If there are no more word tokens contained in the search query, the "NO" branch is taken to step 350, where the concept tokens are weighted according to the number of word tokens in the search query which referenced concept identifiers associated with the concept token. This weighting is accomplished by normalizing the number of occurrences of the concept token, with the largest number of occurrences equal to 1000. For instance, if three concept tokens were referenced 5, 8, and 11 times in a search query, the normalized weights of the three concept tokens would be 455, 727, and 1000, respectively. In this manner, concepts which are referenced more frequently in a search query are given a higher weight.

From step 350, the method continues to step 355, where the concept tokens are ordered according to their normalized weights. In an exemplary embodiment, concept tokens with normalized weights less than a threshold value may be truncated to prevent searching for weak concepts.

From step 355, the method continues to step 360, where the concept tokens and their associated normalized weights are passed to the search engine. Also passed along with the concept tokens are instructions to the search engine to search only the "nyms" portion of the HTML META tag described above for the concept tokens. In this manner, only the CONTENT portion of the HTML META tag is searched. Therefore, the search engine matches concepts identified in the document and embedded in the META tag with concepts identified in the query. The method 300 ends at step 370. In the exemplary embodiment, the concept tokens and weights are passed to the search engine as a "vector query", that is, a query using the "Vector Space Model" described above. Another embodiment could also pass the tokens in the form of a Boolean AND or OR query, or in any other form supported by the particular search engine being used.

Preprocessing an Exemplary Document

FIG. 4 illustrates the operation of the exemplary embodiment for preprocessing a document using an exemplary document. Referring now to FIGS. 1, 2 and 4, an exemplary document 405 contains text 406 and is to be preprocessed prior to submission to search engine 62 for inclusion in the document database 64. In an embodiment, document 405 will be stored in RAM 25 or on hard disk 27 prior to submission to search engine 62. After the document 405 has been preprocessed, it will be stored on remote computer 49 in document database 64.

In an exemplary embodiment, the method 200 for document preprocessing is embodied in a document preprocessing application program 60 which runs on remote computer 49. However, those skilled in the art will understand that the document preprocessing application program 60, may be run on personal computer 20 or on another computer system connected via local area network 51 or wide area network 52.

Document 405 contains exemplary text 406 which reads: "The appearance of a font may be changed by modifying its weight and color. A red, green, or blue font is attractive." Preprocessing of document 405 will now be described with reference to FIG. 2 and method 200. The method 200 for preprocessing exemplary document 405 begins at step 210 by reading the document 405. At step 215, the first word token in document 405 is read. Because each of the words in text 406 constitutes a word token, the first word token is "The."

From step 210, the method continues to step 220, where the concept database 63 is consulted to determine if it contains the word token "The." Concept database 63 contains word tokens 407 which map to zero or more concept identifiers 408. Because concept database 63 does not contain the word token "The," the "NO" branch is taken from step 225 to decision step 240, where a determination is made as to whether the document 305 contains more word tokens. Because document 305 does contain additional word tokens, the "YES" branch is followed to step 245, where the next word token, "appearance," is read from document 405.

At step 220, the concept database 63 is again consulted to determine if it contains the word token "appearance." Because the concept database 63 does contain the word token "appearance," the "YES" branch is followed to step 230, where the concept identifier 408 associated with the word token "appearance" is read. The weight associated with the word token 408 is also read from the concept database 63. The word token "appearance" is associated with the concept identifier "appearance." Because the word token 408 describes the concept identifier so strongly (they are identical), the numerical weight associated with the word token is 10 (out of a possible 10).

From step 230, the method continues to step 235 where the word token weight (10) is added to the sum of word token weights for previous word tokens with the same concept identifier ("appearance"). Because there are no previous word token weights for document 405, there is nothing to add and the method 200 continues at step 240.

Steps 225, 230, 235, 240, 225 and 220 are repeated in the above-described manner until there are no more word tokens in document 405. The method 200 then continues at step 250, where the sums of the word token weights for each of the concept identifiers 408 are normalized to 1000. In the exemplary document 405, three concept identifiers 408 are referenced: "color," "font," and "appearance." The sums of the word token weights for these three concept identifiers are 34, 14, and 21, respectively. Therefore, the normalized weights are 1000, 412 and 618, respectively.

From step 250, the method continues to step 255 where each of the concept identifiers, "color," "font," and "appearance," are converted to unique non-word concept tokens 409 Q1A5, QABC, and QX2H, respectively. This process is described in detail above. At step 260, concept tokens 409 are arranged according to their associated normalized weights. The concept token for "color" (Q1A5) is placed first in the list because it has the highest normalized weight (1000), and is followed by the concept token for "appearance" (QX2H) and then the concept token for "font" (QABC).

From step 260, the method continues to step 265 where concept tokens 409 are embedded into document 405 using HTML META tag 411 to create preprocessed document 410. In the exemplary embodiment, multiple occurrences of concept tokens may be inserted for concepts with high normalized weights. For instance, because "appearance" had the highest normalized weight in document 405, multiple instances of the concept token Q1A5 may be placed in the META tag.

From step 265, the method continues to step 270 where preprocessed document 410 with concept tokens 408 inserted is passed to search engine 62. Search engine 62 then adds preprocessed document 410 to the document database 64 as it normally would. The preprocessing of document 405 is completely invisible to search engine 62. The method 200 ends at step 280.

Preprocessing an Exemplary Search Query0

FIG. 5 is illustrates preprocessing a user search query using an exemplary query. Referring now to FIGS. 1, 3, and 5, an exemplary search query 505 would typically be typed on keyboard 40 by a user for transmission to remote computer 49 using a browser application program 36. The query preprocessor application program 61 would intercept the search query 505 and preprocess it prior to submission to the search engine program 62. The operation of the query preprocessor application program 61 would be invisible to both the user and to the search engine 62.

The method 300 for preprocessing a search query begins at step 310 where the exemplary search query 505 is read.

The exemplary search query 505 contains text 506 which reads: "Can I modify the color of a font to make it look more attractive?"

From step 310, the method continues to step 315, where the first word token, "can," in search query 505 is read. At step 320, the word token "can" is looked up in the concept database 63. At decision step 325, a determination is made as to whether the word token "can" is contained in concept database 63. Because concept database 63 does not contain the word token "can," the "NO" branch is taken to step 340 where a determination is made as to whether the search query contains additional word tokens. Because exemplary search query 505 contains additional word tokens, the "YES" branch is taken to step 345 where the next word token, "I" is read.

Steps 320, 325, 340, and 345 of method 300 are repeated until a word token in exemplary search query 505 is encountered which is contained in concept database 63. The first such word token is "color," which will be read at step 345 of method 300. The method 300 then continues to step 320, where the word token "color" is looked up in concept database 63. At decision step 325, a determination is made as to whether word token "color" is contained in concept database 63. Because "color" is contained in concept database 63, the "YES" branch is taken to step 330, where the concept identifiers 408 associated with the word token "color" are read from the concept database 63. The only concept identifier associated with the word token "color" is the concept identifier "color." At step 335, the concept identifier "color" is converted into a unique non-word concept token using the procedure described above. The word token "color," for instance, will be converted to the concept token Q1A5.

From step 335, the method continues to decision step 340, where a determination is made as to whether there are more word tokens in the search query 505. Because there are more word tokens, the above procedure repeats until there are no more word tokens contained in the search query 505.

When there are no more word tokens contained in search query 505, the method 300 branches to step 350, where concept tokens 409 are assigned a normalized weight according to the number of times which they were referenced in search query 505, with the concept token with the most occurrences being assigned 1000. Because the concept token QX2H ("appearance") was referenced twice (word tokens "look" and "attractive"), it is given the normalized weight 1000. The other two concept tokens (Q1A5 and QABC) are each assigned a normalized weight of 500 because they were each only referenced one time.

From step 350, the method continues to step 355, where the concept tokens 409 are ordered into a list according to their assigned normalized weights. The normalized weights are also included in the list along with the concept tokens. Text is prepended to the list to instruct the search engine to search the "nyms" portion of the META tag for the concept tokens. An exemplary string may look like:

<Search META "nyms" for QX2H (1000) Q1A5 (500) QABC (500)>

From step 355, the method continues to step 360, where the string including the concept tokens 409 and their normalized weights are passed to the search engine as a normal search query. The method 300 ends at step 370.

In view of the foregoing, it will be appreciated that the present invention provides a method and apparatus for concept searching using a Boolean or keyword search engine. It should be understood that the foregoing relates only to specific embodiments of the present invention, and that numerous changes may be made therein without departing from the spirit and scope of the invention as defined by the following claims.

What is claimed is:

1. A computer-readable medium on which is stored a computer program for preprocessing a document comprising one or more word tokens, the computer program comprising instructions which, when executed by a computer, perform the steps of:

determining whether one of the word tokens in the document is contained in a concept database;

in response to determining that one of the word token s is contained in the concept database, reading a plurality of concept identifiers associated with the word token from the concept database; and in response to reading the concept identifier, assigning the concept identifiers to unique non-word concept tokens, and embedding the concept tokens in the document for use by a search engine not otherwise capable of concept searching.

2. The computer-readable medium of claim 1, further comprising the following steps after the assigning step:

determining whether the document contains additional word tokens; and in response to determining that the document contains additional word tokens, incrementing to the next word token contained in said document and repeating from the first determining step.

3. A computer-readable medium on which is stored a computer program for preprocessing a document comprising one or more word tokens, the computer program comprising instructions which, when executed by a computer, perform the steps of:

determining whether one of the word tokens is contained in a concept database;

in response to determining that the word token is contained in the concept database, reading a plurality of concept identifiers associated with the word token from the concept database, and reading a numerical weight associated with the word token from the concept database;

in response to reading the concept identifiers and weights, adding the numerical weights to the sum of any numerical weights for previous word tokens associated with the concept identifiers to create a sum of word token weights for each of the plurality of concept identifiers;

in response to adding the weights, determining whether the document contains additional word tokens;

in response to determining that the document contains additional word tokens, incrementing to the next word token contained in said document and repeating from the first determining step; and in response to determining that the document does not contain additional word tokens, normalizing the sums of word token weights for each of the plurality of concept identifiers, arranging each of the plurality of concept identifiers according to the value of said normalized sums of word token weights, converting each of the plurality of concept identifiers to unique concept tokens, and embedding the concept tokens in the document.

4. A computer-readable medium on which is stored a computer program for preprocessing a query comprising one or more word tokens, the computer program comprising instructions which, when executed by a computer, perform the steps of:

determining whether one of the word tokens in the query is contained in a concept database;

in response to determining that the word token is contained in the concept database, reading concept identifiers associated with the word token from the concept database; and in response to reading concept identifiers, assigning the concept identifiers to unique non-word concept tokens and passing the concept identifiers to a search engine not otherwise capable of concept searching as search parameters.

5. The computer-readable medium of claim 4, further comprising the following steps after the reading step and before the assigning step:

determining whether the query contains additional word tokens; and in response to determining that the query contains additional word tokens, selecting the next word token contained in the query and repeating from the first determining step.

6. A computer-readable medium on which is stored a computer program for preprocessing a query comprising one or more word tokens, the computer program comprising instructions which, when executed by a computer, perform the steps of:

determining whether one of the word tokens in the query is contained in a concept database;

in response to determining that the word token is contained in the concept database, reading concept identifiers associated with the word token from the concept database;

in response to reading concept identifiers, assigning the concept identifiers to unique concept tokens, and determining whether the query contains additional word tokens;

in response to determining that the query contains additional word tokens, selecting the next word token contained in the query and repeating from the first determining step; and in response to determining that the query does not contain additional word tokens, assigning each concept token a normalized weight based upon the number of occurrences of each of the concept tokens, arranging each of the concept tokens according to the value of the normalized weights associated with said concept tokens, and passing the concept tokens and normalized weights to the search engine.

7. The computer-readable medium of claim 6, wherein the arranging step further comprises removing concept tokens whose normalized weights are less than a threshold value.

8. A method for preprocessing a document comprising one or more word tokens, the method comprising the steps of:

determining whether one of the word tokens in the document is contained in a concept database; and in response to determining that the word token is contained in the concept database, reading concept identifiers associated with the word token from the concept database, converting the concept identifiers to unique non-word concept tokens, and embedding the concept tokens in the document for use by a search engine not otherwise capable of concept searching.

9. The method of claim 8, further comprising the following steps after the embedding step:

determining whether the document contains additional word tokens; and in response to determining that the document contains additional word tokens, selecting the next word token in the document and repeating from the first determining step.

10. A method for preprocessing a document comprising one or more word tokens, the method comprising the steps of:

determining whether one of the word tokens in the document is contained in a concept database;

in response to determining one of the word tokens is contained in the concept database, reading concept identifiers associated with the word token from the concept database, and reading a numerical weight associated with the word token from the concept database;

in response to reading concept identifiers and a numerical weight, adding the numerical weight to the sum of any numerical weights for any previous word tokens associated with the plurality of concept identifiers to create a sum of word token weights for each of said plurality of concept identifiers and determining whether said document contains additional word tokens;

in response to determining that the document contains additional word tokens, selecting the next word token contained in the document and repeating from the determining step; and in response to determining that the document does not contain additional word tokens, normalizing the sums of word token weights for each of the concept identifiers, arranging each of the concept identifiers according to the value of the normalized sums of word token weights, converting each of the concept identifiers to unique concept tokens, and embedding the concept tokens in the document.

11. A method for preprocessing a query comprising one or more word tokens, the method comprising the steps of:

determining whether one of the word tokens in the query is contained in a concept database;

in response to determining that the word token is contained in the concept database, reading concept identifiers associated with said word token from said concept database; and in response to reading concept identifiers, assigning the concept identifiers to unique non-word concept tokens said passing the concept identifiers to the search engine for use by a search engine not otherwise capable of concept searching.

12. The method of claim 11, further comprising the following steps after the reading step:

determining whether the query contains additional word tokens; and in response to determining that the query contains additional word tokens, selecting the next word token in the query and repeating from the first determining step.

13. A method for preprocessing a query comprising a one or more word tokens, the method comprising the steps of:

determining whether one of the word tokens in the query is contained in a concept database;

in response to determining that the word token is contained in the concept database, reading a plurality of concept identifiers associated with the word token from the concept database, assigning each of the concept identifiers to concept tokens, and determining whether the query contains additional word tokens;

in response to determining that the query contains additional word tokens, selecting the next word token in the query and repeating from the first determining step; and in response to determining that the query does not contain additional word tokens, assigning each concept token a normalized weight based upon the number of occurrences of each of the concept tokens, arranging each of he concept tokens according to the value of the normalized weights associated with the concept tokens, and passing the concept tokens and normalized weights to the search engine.

14. The method of claim 13, wherein the arranging step further comprises removing concept tokens whose normalized weights are less than a threshold value.

15. A computer apparatus for preprocessing a document comprising one or more word tokens, the computer apparatus comprising:

a processor;

a storage unit coupled to the processor, the storage unit maintaining the document and a concept database comprising a plurality of word tokens associated with a plurality of concept identifiers;

a memory coupled to the processor;

the processor being operative to read one of the word tokens from the document;

determine whether the word token is contained in the concept database;

in response to determining that the word token is contained in the concept database, said processor operative to read concept identifiers associated with the word token from the concept database, to read a numerical weight associated with the word token from said concept database, to add the numerical weight to the sum of any numerical weights for any previous word tokens associated with said plurality of concept identifiers to create a sum of word token weights for each of said plurality of concept identifiers, and to determine whether the document contains additional word tokens;

in response to determining that the document contains additional word tokens, said processor operative to read the next word token from said document and repeat from the first determining step; and in response to determining that the document does not contain additional word tokens, said processor operative to normalize the sums of word token weights for each of the plurality of concept identifiers, to arrange each of said plurality of concept identifiers according to the value of said normalized sums of word token weights, to convert each of said plurality of concept identifiers to unique concept tokens, and to embed the concept tokens in the document.

16. A computer apparatus for preprocessing a query comprising one or more word tokens, the computer apparatus comprising:

a processor;

a storage unit coupled to the processor, the storage unit maintaining the query and a concept database comprising a plurality of word tokens associated with a plurality of concept identifiers;

a memory coupled to the processor;

the processor being operative to read one of the plurality of word tokens from the query;

determine whether the word token is contained in the concept database;

in response to determining that the word token is contained in the concept database, said processor operative to read concept identifiers associated with the word token from the concept database, to assign each of the concept identifiers to unique concept tokens, and to determine whether the query contains additional word tokens;

in response to determining that the query contains additional word tokens, said processor operative to read the next word token contained in said query and repeat from the first determining step; and in response to determining that the query does not contain additional word tokens, said processor operative to assign each of the concept tokens a normalized weight based upon the number of occurrences of each of the concept tokens, to arrange each of the concept tokens according to the value of the normalized weights associated with the concept tokens, and to transmit the concept tokens and the normalized weights to the search engine.

* * * * *

UNITED STATES PATENT AND TRADEMARK OFFICE
CERTIFICATE OF CORRECTION

PATENT NO.    : 6,363,373 B1
DATED         : March 26, 2002
INVENTOR(S)   : Steinkraus It is certified that error appears in the above-identified patent and that said Letters Patent is hereby corrected as shown below:

Column 11,
Line 12, "token s" should read -- tokens --
Line 16, "identifier" should read -- identifiers --

Column 13,
Line 44, "said passing" should read -- and passing --

Column 14,
Line 5, "he" should read -- the --

Signed and Sealed this

Second Day of July, 2002

Attest:

JAMES E. ROGAN
Attesting Officer      Director of the United States Patent and Trademark Office